(12) United States Patent
Liu et al.

(10) Patent No.: US 8,006,906 B2
(45) Date of Patent: Aug. 30, 2011

(54) ARRANGEMENT FOR AND METHOD OF GENERATING UNIFORM DISTRIBUTED LINE PATTERN FOR IMAGING READER

(75) Inventors: Rong Liu, Centereach, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 117 days.

(21) Appl. No.: 12/380,142

(22) Filed: Feb. 24, 2009

(65) Prior Publication Data

US 2010/0213258 A1 Aug. 26, 2010

(51) Int. Cl.
*G06K 7/10* (2006.01)

(52) U.S. Cl. ............... 235/462.42; 235/462.41

(58) Field of Classification Search ............. 235/462.41, 235/462.42, 454; 250/216
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,304,786 A | 4/1994 | Pavlidis et al. | |
| 5,371,347 A * | 12/1994 | Plesko | 235/462.15 |
| 5,703,349 A | 12/1997 | Meyerson et al. | |
| 6,651,888 B1 * | 11/2003 | Gurevich et al. | 235/462.21 |
| 6,808,114 B1 * | 10/2004 | Palestini et al. | 235/454 |
| 7,478,757 B2 * | 1/2009 | Vasic et al. | 235/491 |
| 2008/0023549 A1 * | 1/2008 | Gurevich et al. | 235/462.22 |

* cited by examiner

*Primary Examiner* — Daniel A Hess
*Assistant Examiner* — Tabitha Chedekel

(57) ABSTRACT

A module and an arrangement for, as well as a method of, generating a generally uniform distributed line pattern of light on a symbol to be read by image capture, include a light source for generating light along an optical axis in a distribution having different extents along intersecting directions generally perpendicular to the axis, and an optical component for receiving, and for optically modifying, the light from the light source to generate the generally uniform distributed line pattern of light on the symbol. The optical component includes a plurality of compound conic elements spaced apart from one another along one of the directions. Each compound conic element has a pair of conic segments for modifying the light along the one direction. A collimating lens modifies the light along the other of the directions. A solid-state imager has an array of image sensors for capturing return light from the symbol over a field of view having different extents along the intersecting directions.

19 Claims, 3 Drawing Sheets

ARRANGEMENT FOR AND METHOD OF GENERATING UNIFORM DISTRIBUTED LINE PATTERN FOR IMAGING READER

DESCRIPTION OF THE RELATED ART

Solid-state imaging systems or imaging readers, as well as moving laser beam readers or laser scanners, have both been used, in both handheld and hands-free modes of operation, to electro-optically read targets, such as one-dimensional bar code symbols, particularly of the Universal Product Code (UPC) symbology, each having a row of bars and spaces spaced apart along a scan direction, as well as two-dimensional symbols, such as the Code 49 symbology, which introduced the concept of vertically stacking a plurality of rows of bar and space patterns in a single symbol, as described in U.S. Pat. No. 4,794,239. Another two-dimensional symbology for increasing the amount of data that can be represented or stored oil a given amount of surface area is known as PDF417 and is described in U.S. Pat. No. 5,304,786.

The imaging reader includes an imaging module having a solid-state imager with an array of photocells or light sensors, which correspond to image elements or pixels in a field of view of the imager, and an imaging lens assembly for capturing return light scattered and/or reflected from the symbol being imaged, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the imager, especially in dimly lit environments and/or at far range reading, the imaging module generally also includes an illuminating light assembly for illuminating the symbol with illumination light for reflection and scattering therefrom. When the imager is one-dimensional, i.e., linear, or is two-dimensional with an anamorphic field of view, the illumination light preferably is distributed along a short height, distributed pattern, also termed an illuminating or scan line, that extends lengthwise along the symbol. The distributed line pattern is typically generated by using a single, large light source, e.g., a light emitting diode (LED) sized in the millimeter range, and a single cylindrical lens.

Although generally satisfactory for its intended purpose, the use of the single large LED and the single cylindrical lens has been problematic, because the distributed line pattern typically has a height taller than that desired, does not have sharp edges, is dominated by optical aberrations, and is non-uniform in intensity since the light intensity is brightest along an optical axis on which the LED is centered, and then falls off away from the axis, especially at opposite end regions of the distributed line pattern. Also, the coupling efficiency between the LED and the cylindrical lens has been poor. Adding an aperture stop between the LED and the cylindrical lens will improve the sharpness (i.e., shorten the height) of the distributed line pattern, but at the cost of a poorer coupling efficiency and a dimmer distributed line pattern that, of course, degrades reading performance.

In addition, the use of an imaging reader has been frustrated, because an operator cannot tell whether the imager, or the reader in which the imager is mounted, is aimed directly at the target symbol, which can be located anywhere within a range of working distances from the reader. The imager is a passive unit and provides no visual feedback to the operator to advise where the imager is aimed. To alleviate such problems, the prior art has proposed an aiming light assembly for an imaging reader. The known aiming light assembly utilizes an aiming light source for generating an aiming beam and an aiming lens for focusing the aiming beam as a visible aiming light line or pattern on the symbol prior to reading. The above-described illuminating light assembly can also serve as the aiming light assembly, in which case, the aiming pattern will suffer the same disadvantages described above for the distributed line pattern.

SUMMARY OF THE INVENTION

One feature of the present invention resides, briefly stated, in a module or an arrangement for generating a generally uniform distributed line pattern of light on a symbol to be read by image capture. The module or arrangement includes a light source for generating light along an optical axis in a light distribution having different extents along intersecting directions, e.g., the horizontal and vertical directions, generally perpendicular to the axis.

In one embodiment, the light source is an aiming light source for generating an aiming light pattern on the symbol. In another embodiment, the light source is an illumination light source for illuminating the symbol with an illumination light pattern. In either or both embodiments, the light source is a plurality of light emitting diode (LED) chips, each sized in the micron range and serving essentially as point sources, spaced apart from one another along the horizontal direction. Alternatively, the light source is a single, horizontally elongated, linear LED chip in a casing having a narrow vertical slit or opening. In either alternative, the light distribution is wide or long along the horizontal direction and extends lengthwise across and past the symbol, and is short and narrow along the vertical direction and extends for a small limited distance heightwise of the symbol.

The module or arrangement further includes an optical component for receiving, and for optically modifying, the light from the light source to generate the generally uniform distributed line pattern of light on the symbol. The optical component includes a plurality of compound conic elements spaced apart from one another along the horizontal direction. Each compound conic element has a pair of conic segments, such as parabolic or hyperbolic segments, preferably mirror symmetrical, for modifying the light along the horizontal direction. Each LED chip is associated, and is located in close proximity, with a light-receiving input end region of a respective compound conic element. In one embodiment, each compound conic element is a solid element, and the segments reflect and concentrate the light from the light source with total internal reflection toward an output end region of the respective compound conic element. In another embodiment, each compound conic element is a hollow mirror, and the segments have reflective coatings for reflecting and concentrating the light from the light source toward the respective output end region. The light exiting the output end regions overlap in the far field to generate the generally uniform distributed line pattern of light on the symbol.

The optical component preferably includes a collimating lens for modifying the light along the vertical direction. The collimating lens preferably has tapered walls diverging apart from each other in a direction away from the light source. The collimating lens has an optical power for collimating the light along the vertical direction. Each compound conic element may alternately have another pair of conic segments, such as parabolic or hyperbolic segments, preferably mirror symmetrical, for reflecting and concentrating the light along the vertical direction.

The module or arrangement still further includes a solid-state imager, such as a CCD or a CMOS, having an array of image sensors for capturing return light from the symbol over a field of view having different extents along the intersecting horizontal and vertical directions. The array is one-dimensional, i.e., linear, or is two-dimensional with an anamorphic field of view. The field of view of the imager generally matches the distributed line pattern of light on the symbol.

Each LED chip emits light, typically with a Lambertian intensity profile in which the intensity falls off along the horizontal direction as a function of the cosine angle. Hence, the LED chips are preferably spaced apart such that their intensity profiles exiting the optical component overlap, thereby creating a more uniform intensity distribution along the horizontal direction. One or more of the LED chips is associated with each compound conic element.

For a more integrated construction, the imager is centrally located among the LED chips. An aperture extend through the optical component to enable captured light to be captured and projected onto the imager. The LED chips can be configured to emit light of different colors. For example, one group of the chips could emit green light which is mole visible to a human eye, and thus is especially useful when the distributed line pattern is used as an aiming pattern; and another group of the chips could emit red light which is less visible to the human eye due to decreased sensitivity to red light, and thus is especially useful when the distributed line pattern is used as an illuminating pattern for less glare.

In accordance with this invention, the optical component forms the distributed line pattern as wide and short with sharp edges and as not dominated by optical aberrations. The intensity of the distributed line pattern is uniform with much less fall off away from the axis at opposite end regions of the distributed line pattern. Also, the coupling efficiency between the light source and the optical component is much improved, thereby increasing light throughput and enhancing reading performance.

The method of generating a generally uniform distributed line pattern of light on a symbol to be read by image capture is performed by generating light from a light source along an optical axis in a distribution having different extents along intersecting directions generally perpendicular to the axis; receiving, and optically modifying, the light to generate the generally uniform distributed line pattern of light on the symbol, by spacing a plurality of compound conic elements apart from one another along one of the directions, by configuring each compound conic element with a pair of conic segments for modifying the light along the one direction, and by modifying the light along the other of the directions; and capturing return light from the symbol over a field of view having different extents along the intersecting directions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
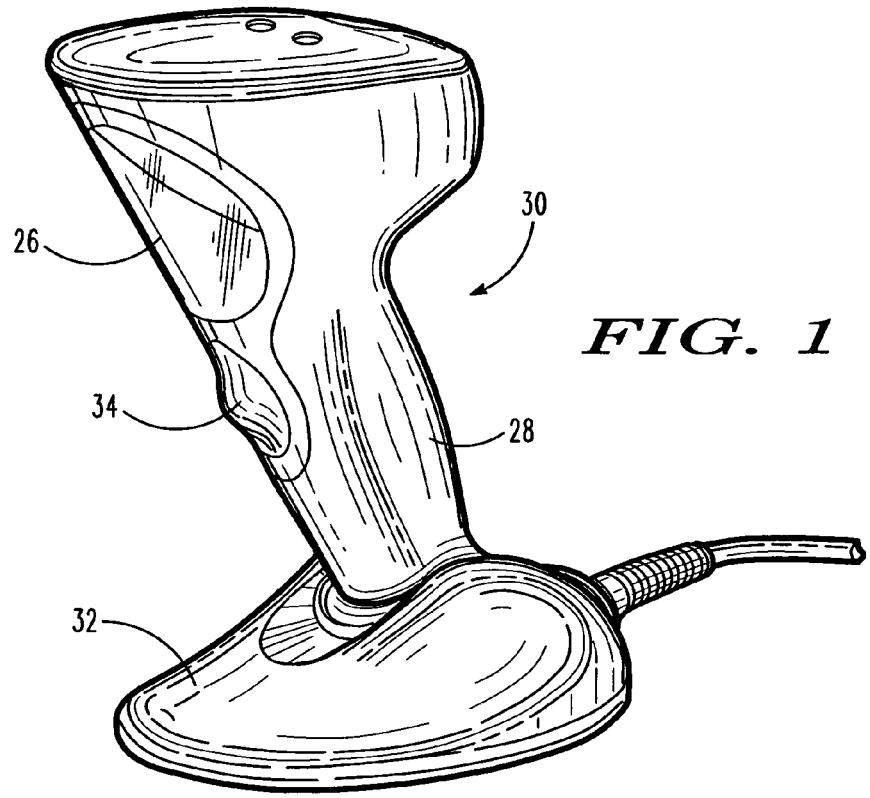
FIG. 1 is a perspective view of a portable imaging reader operative in either a handheld mode, or a hands-free mode, for capturing return light from target symbols.

Reference numeral 30 in FIG. 1 generally identifies an imaging reader having a generally upright window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which a trigger 34 is manually depressed to initiate imaging of indicia, especially one-dimensional symbols, to be read at far distances from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
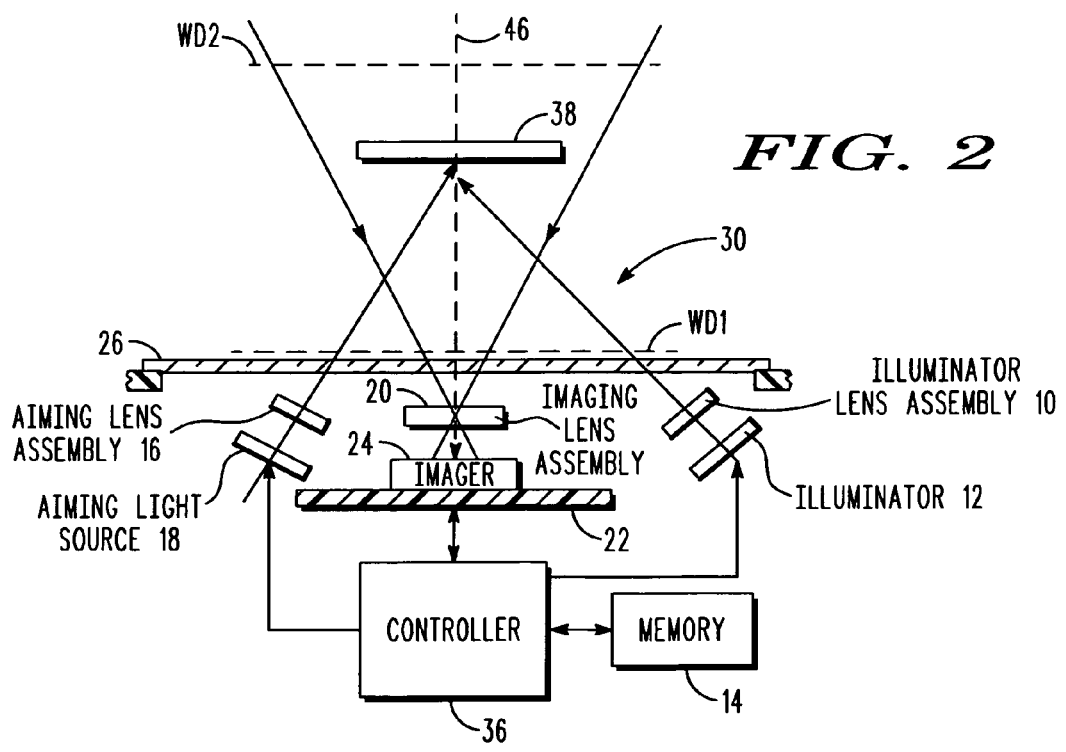
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, preferably with an anamorphic field of view, and operative for detecting return light captured by an imaging lens assembly 20 along an optical path or axis 46 through the window 26. The return light is scattered and/or reflected from a target or symbol 38 over the field of view. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly or system is also mounted in the imaging reader and preferably includes an illuminator or illuminating light source 12, e.g., a light emitting diode (LED), and an illuminating lens assembly 10 to uniformly illuminate the symbol 38 with an illuminating light pattern.

Figure 3:
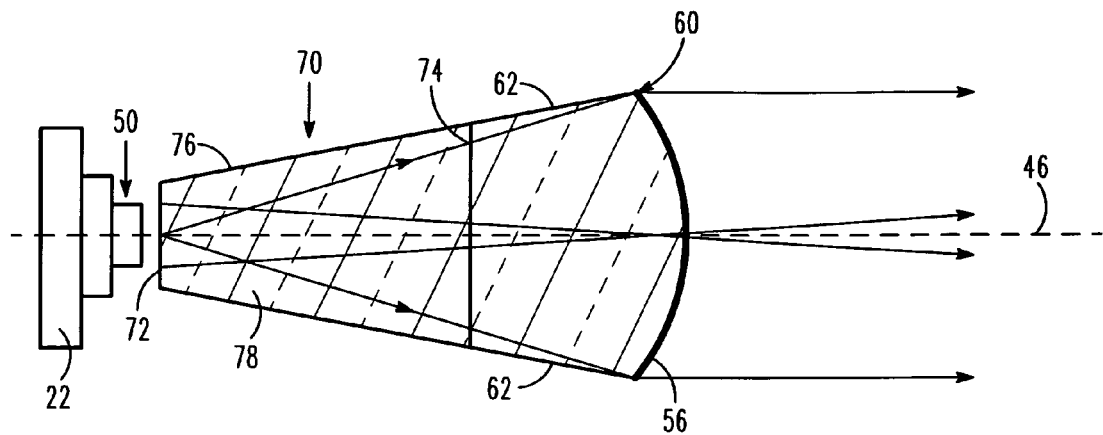
FIG. 3 is a side elevational view of the aiming light system and/of the illumination light system of FIG. 2 in accordance with one embodiment of an optical component of the present invention.
Figure 4:
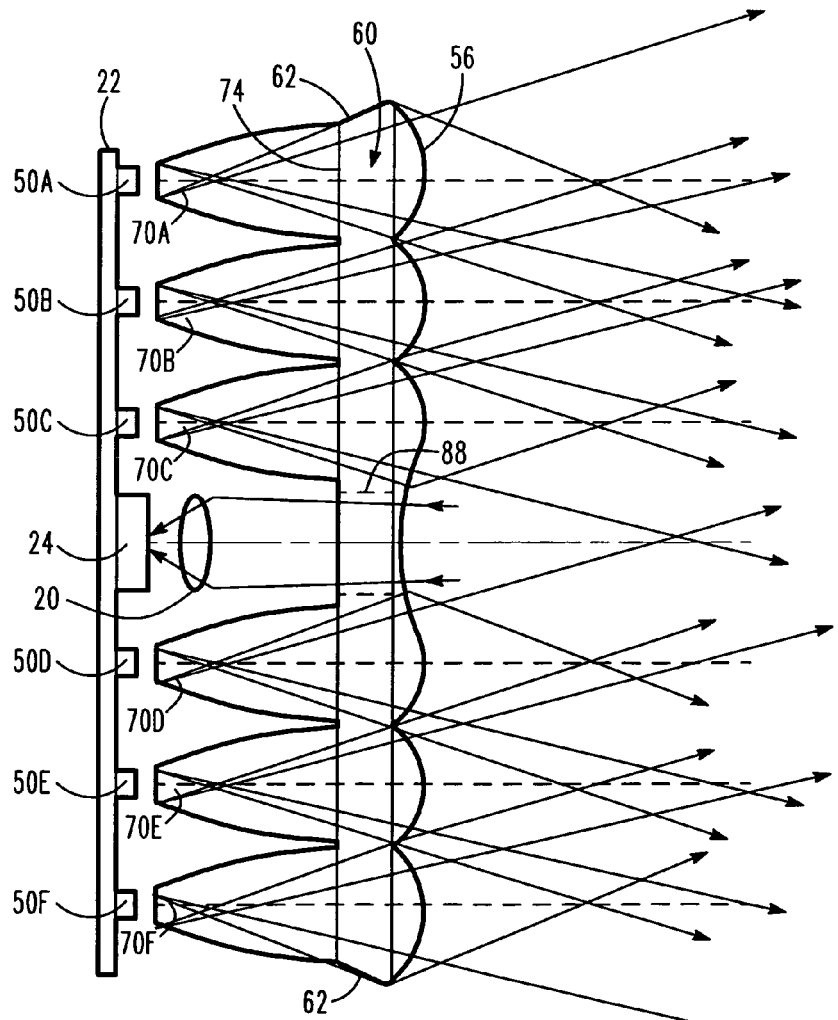
FIG. 4 is a top plan view of the systems of FIG. 3.

Details of the illuminating assembly, as best seen in the embodiment of FIGS. 3-4, are described below.

An aiming assembly or system is also mounted in the imaging reader and preferably includes an aiming light source 18, e.g., an LED, and an aiming lens assembly 16 for generating an aiming light pattern on the symbol 38. Details of the aiming assembly, as also best seen in the embodiment of FIGS. 3-4, are described below.

As shown in FIG. 2, the imager 24, the illuminating light source 12 and the aiming light source 18 are operatively connected to a controller or microprocessor 36 operative for controlling the operation of these components. A memory 14 is connected and accessible to the controller 36. Preferably, the microprocessor is the same as the one used for processing the return light from target symbols and for decoding the captured target images.

In operation, the microprocessor 36 sends a command signal to energize the aiming light source 18 prior to reading, and also pulses the illuminating light source 12 for a short exposure time period, say 500 microseconds or less, and energizes and exposes the imager 24 to collect light, e.g., illumination light and/or ambient light, from the target symbol 38 only during said exposure time period. A typical array needs about 18-33 milliseconds to acquire the entire target image and operates at a frame rate of about 30-60 frames per second.

One feature of the present invention resides, briefly stated, in a module or an arrangement for, and a method of, generating a generally uniform distributed line pattern of light on the symbol 38 to be read by image capture. The module or arrangement includes a light source 50, as shown in FIG. 3 or in FIG. 7, for generating light along the optical axis 46 in a light distribution having different extents along intersecting directions, e.g., the horizontal and vertical directions, generally perpendicular to the axis 46. FIG. 3 depicts the light distribution along the vertical direction, and FIG. 4 depicts the light distribution along the horizontal direction.

Figure 7:
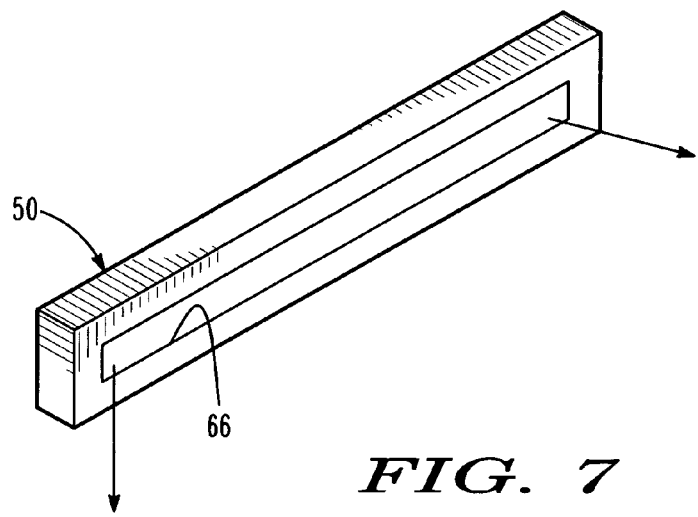
FIG. 7 is a perspective view of another embodiment of a light source for use with the present invention.

In one embodiment, the light source 50 is the aiming light source 18 for generating the aforementioned aiming light pattern on the symbol 38. In another embodiment, the light source 50 is the illumination light source 12 for illuminating the symbol 38 with the aforementioned illumination light pattern. In either or both embodiments, the light source 50, as shown in FIG. 4, is configured as a plurality of light emitting diode (LED) chips 50A, 50B, 50C, 50D, 50E, 50F, each sized in the micron range and serving essentially as point sources, spaced slightly apart from one another along the horizontal direction. Although six chips have been illustrated, this is merely exemplary, because more or less than six chips could be employed. Alternatively, the light source 50, as shown in FIG. 7, can be configured as a single, horizontally elongated, linear LED chip in a casing having a narrow vertical slit or opening 66. In either alternative, the light distribution is wide or long along the horizontal direction and extends lengthwise across and past the symbol 38, and is short and narrow along the vertical direction and extends for a small limited distance heightwise of the symbol 38.

The module or arrangement further includes an optical component 70, as shown in FIG. 3, for receiving, and for optically modifying, the light from the light source 50 to generate the generally uniform distributed line pattern of light on the symbol 38. The optical component 70 includes a plurality of compound conic elements 70A, 70B, 70C, 70D, 70E, 70F, as shown in FIG. 4, spaced apart from one another along one of said directions, e.g., the horizontal direction. Each compound conic element 70A, 70B, 70C, 70D, 70E, 70F has a pair of conic segments, such as parabolic or hyperbolic segments, preferably mirror symmetrical, for modifying the light along the horizontal direction. More specifically, each compound conic element constrains and concentrates the light from the light source 50 to exit the respective compound conic element over a predetermined conical exit angle "A" (see FIG. 6) and thereby increases the light throughput. The optical component 70 also includes a collimating lens 60 for modifying the light along the other of said directions, e.g., the vertical direction. The optical component 70, which includes the compound conic elements 70A, 70B, 70C, 70D, 70E, 70F and the collimating lens 60, serves as the illuminator lens assembly 10 and/or as the aiming lens assembly 16.

Each LED chip 50A, 50B, 50C, 50D, 50E, 50F is associated with a light-receiving input end region 72 of a respective compound conic element to couple light from the light source into the respective compound conic element. Each LED chip may be positioned, as illustrated, in close confronting proximity to the respective input end region 72, or even in direct contact therewith, at the focal plane. To insure an efficient light coupling and to resist optical crosstalk among the LED chips, an index-matched gel may be inserted between each LED chip and the respective compound conic element, or a mechanical baffle between each adjacent pair of chips. In the embodiments illustrated by FIGS. 3-5, each compound conic element is a solid element, and the conic segments reflect the light with total internal reflection away from the light source 50 toward an output end region 74 of a respective compound conic element. In the embodiment illustrated by FIG. 6, each compound conic element is a hollow mirror, and the conic segments have internal reflective coatings 84, 86 for reflecting the light away from the light source 50 toward the respective output end region 74. In the case of a hollow mirror, each LED chip can be positioned slightly inside the respective compound conic element, in which event, the respective compound conic element acts like a mechanical baffle to resist optical crosstalk among the LED chips, and also acts like an alignment aid. The light exiting the output end regions 74 overlap in the far field, that is, the predetermined conical exit angles "A" overlap, to generate the generally uniform distributed line pattern of light on the symbol.

Figure 5:
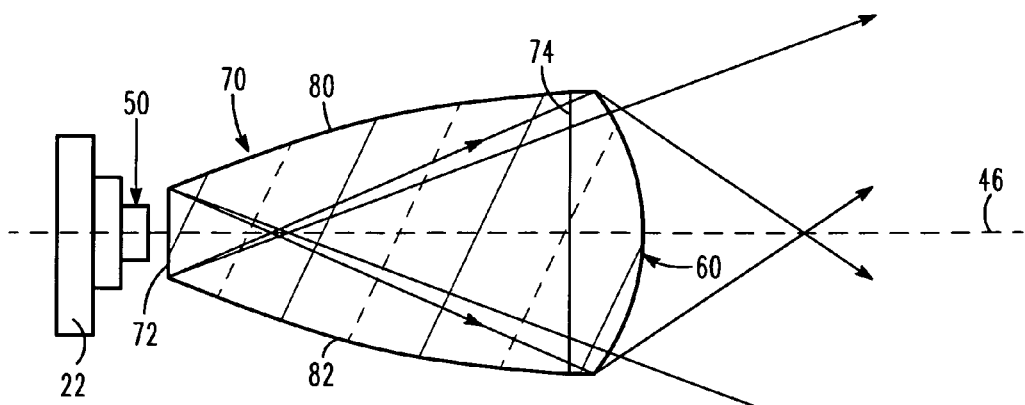
FIG. 5 is a view analogous to FIG. 4 but of another embodiment of the optical component for use with the present invention.
Figure 6:
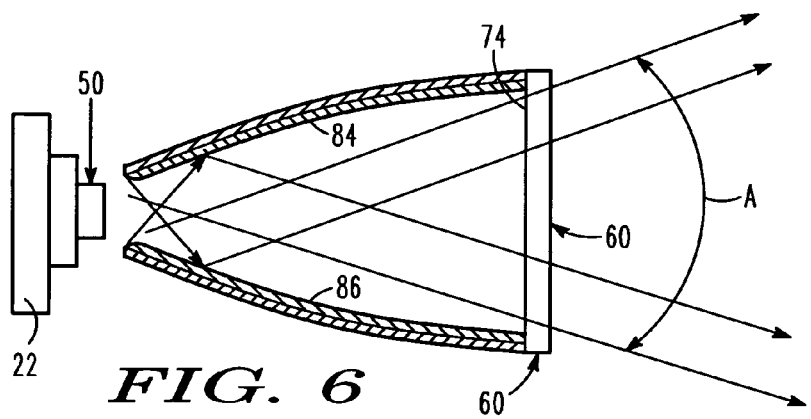
FIG. 6 is a view of still another embodiment of an optical component for use with the present invention.

The collimating lens 60 of FIGS. 3-4 has an optical power for distributing the light along the vertical direction. The collimating lens 60 has a convex curvature 56, preferably an aspheric toroid, for collimating the light. The collimating lens 60 preferably has tapered upper and lower walls 62 diverging apart from each other in a direction away from the light source 50 to resist internal reflections within the collimating lens 60. As illustrated by FIG. 3, each compound conic element has a pair of planar tapered upper and lower opaque walls 76. As illustrated by FIG. 4, the collimating lens 60 has a plurality of convex surfaces spaced along the horizontal direction. As illustrated by FIG. 5, each compound conic element may have another pair of mirror symmetrical upper and lower conic segments 80, 82 for distributing the light along the vertical direction. In this latter case of FIG. 5, a focusing lens is preferably configured with a convex curvature. As illustrated by FIG. 6, the lens may be omitted, or have a zero power, when each compound conic element has a pair of upper and lower conic segments to concentrate the light in the vertical direction, and another pair of left and right side conic segments to distribute the light in the horizontal direction.

The compound conic elements 70A, 70B, 70C, 70D, 70E, 70F and the collimating lens 60 are preferably commonly molded of a one-piece construction, advantageously of a light-transmissive plastic material. Alternatively, the compound conic elements 70A, 70B, 70C, 70D, 70E, 70F can be fabricated as one piece, and the collimating lens 60 can be fabricated as another piece.

As previously noted, the imager 24 captures the return light from the symbol 38 over a field of view having different extents along the intersecting horizontal and vertical directions. The field of view of the imager 24 generally matches the distributed line pattern of light on the symbol 38.

Each LED chip 50A, 50B, 50C, 50D, 50E, 50F emits light, typically with a Lambertian intensity profile in which the intensity falls off along the horizontal direction as a function of the cosine angle. Hence, the LED chips are preferably spaced apart such that their intensity profiles exiting the optical component overlap, thereby creating a more uniform intensity distribution along the horizontal direction. One or more of the LED chips is associated with each compound conic element.

For a more integrated construction, the imager 24 is centrally located among the LED chips on the board 22. An aperture 88 extend through the optical component 70 to enable captured light to be captured and projected onto the imager 24. One or more of the LED chips 50A, 50B, 50C, 50D, 50E, 50F is associated with each compound conic element. The LED chips can be configured to emit light of different colors. For example, one group of the chips could emit green light which is more visible to a human eye, and thus is especially useful when the distributed line pattern is used as an aiming pattern; and another group of the chips could emit red light which is less visible to the human eye due to decreased sensitivity to red light, and thus is especially useful for less glare when the distributed line pattern is used as an illuminating pattern.

In accordance with this invention, the compound conic elements 70A, 70B, 70C, 70D, 70E, 70F and the collimating lens 60 form the distributed line pattern as wide and short with sharp edges and as not dominated by optical aberrations. The intensity of the distributed line pattern is uniform with much less fall off away from the axis 46 at opposite end regions of the distributed line pattern. Also, the coupling efficiency between the elongated light source 50 and the elongated optical component 70 is much improved, thereby increasing light throughput and enhancing reading performance.

It will be understood that each of the elements described above, or two or more together, also may find a useful application in other types of constructions differing from the types described above. For example, higher order aspherical terms could be provided at the ends of the optical component 70 in order to send more light to the opposite end regions of the distributed line pattern.

While the invention has been illustrated and described as an arrangement or module for, and a method of, generating a generally uniform distributed line pattern of light on a symbol to be read by image capture by an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for generating a generally uniform distributed line pattern of light on a symbol to be read by image capture, comprising:
    a light source for generating light along an optical axis in a distribution having different extents along intersecting directions generally perpendicular to the axis;
    an optical component for receiving, and for optically modifying, the light from the light source to generate the generally uniform distributed line pattern of light on the symbol, the optical component including a plurality of compound conic elements spaced apart from one another along one of said directions, each compound conic element having a pair of conic segments for modifying the light along said one direction, and the optical component being further operative for modifying the light along the other of said directions; and
    a solid-state imager having an array of image sensors for capturing return light from the symbol over a field of view having different extents along the intersecting directions.

2. The arrangement of claim 1, wherein the light source is one of an aiming light source for generating an aiming light pattern on the symbol and an illumination light source for illuminating the symbol with an illumination light pattern.

3. The arrangement of claim 1, wherein the light source is a plurality of light emitting diode (LED) chips spaced apart from one another along said one direction, and wherein each LED chip is associated, and in close proximity, with a light-receiving end region of a respective compound conic element.

4. The arrangement of claim 1, wherein the light source is a single elongated light emitting diode (LED) chip extending along said one direction.

5. The arrangement of claim 1, wherein the optical component includes a collimating lens having an optical power for collimating the light along the other of said directions.

6. The arrangement of claim 1, wherein each compound conic element has another pair of conic segments for modifying the light along the other of said directions.

7. The arrangement of claim 5, wherein the field lens has tapered walls diverging apart from each other in a direction away from the light source.

8. The arrangement of claim 1, wherein each compound conic element is a solid element, and wherein the segments reflect the light away from the light source with total internal reflection.

9. The arrangement of claim 1, wherein each compound conic element is a hollow mirror, and wherein the segments have reflective coatings for reflecting the light away from the light source.

10. An imaging reader for electro-optically reading a symbol by image capture, comprising:
    a housing; and
    an imaging module supported by the housing, the module including a light source for generating light along an optical axis in a distribution having different extents along intersecting directions generally perpendicular to the axis, an optical component for receiving, and for optically modifying, the light from the light source to generate the generally uniform distributed line pattern of light on the symbol, the optical component including a plurality of compound conic elements spaced apart from one another along one of said directions, each compound conic element having a pair of conic segments for modifying the light along said one direction, and the optical component being further operative for modifying the light along the other of said directions, and a solid-state imager having an array of image sensors for capturing return light from the symbol over a field of view having different extents along the intersecting directions.

11. A method of generating a generally uniform distributed line pattern of light on a symbol to be read by image capture, comprising the steps of:
generating light from a light source along an optical axis in a distribution having different extents along intersecting directions generally perpendicular to the axis;
receiving, and optically modifying, the light to generate the generally uniform distributed line pattern of light on the symbol, by spacing a plurality of compound conic elements apart from one another along one of said directions, by configuring each compound conic element with a pair of conic segments for modifying the light along said one direction, and by modifying the light along the other of said directions; and
capturing return light from the symbol over a field of view having different extents along the intersecting directions.

12. The method of claim 11, and configuring the light source as one of an aiming light source for generating an aiming light pattern on the symbol and an illumination light source for illuminating the symbol with an illumination light pattern.

13. The method of claim 11, and configuring the light source as a plurality of light emitting diode (LED) chips spaced apart from one another along said one direction, and associating, and mounting in close proximity, each LED chip with a light-receiving end region of a respective compound conic element.

14. The method of claim 11, and configuring the light source as a single elongated light emitting diode (LED) chip extending along said one direction.

15. The method of claim 11, and configuring a collimating lens with an optical power for collimating the light along the other of said directions.

16. The method of claim 11, and configuring each compound conic element with another pair of conic segments for modifying the light along the other of said directions.

17. The method of claim 15, and configuring the collimating lens with tapered walls diverging apart from each other in a direction away from the light source.

18. The method of claim 11, and configuring each compound conic element as a solid element, and reflecting the light away from the segments with total internal reflection.

19. The method of claim 11, and configuring each compound conic element as a hollow mirror, and coating the segments with reflective coatings for reflecting the light away from the light source.

* * * * *

UNITED STATES PATENT AND TRADEMARK OFFICE
CERTIFICATE OF CORRECTION

| | | |
|---|---|---|
| PATENT NO. | : 8,006,906 B2 | Page 1 of 1 |
| APPLICATION NO. | : 12/380142 | |
| DATED | : August 30, 2011 | |
| INVENTOR(S) | : Liu et al. | |

It is certified that error appears in the above-identified patent and that said Letters Patent is hereby corrected as shown below:

In Column 1, Line 19, delete "oil" and insert -- on --, therefor.

In Column 3, Line 33, delete "mole" and insert -- more --, therefor.

In Column 4, Line 12, delete "and/of" and insert -- and/or --, therefor.

Signed and Sealed this
First Day of January, 2013

David J. Kappos
*Director of the United States Patent and Trademark Office*